Patented June 20, 1933

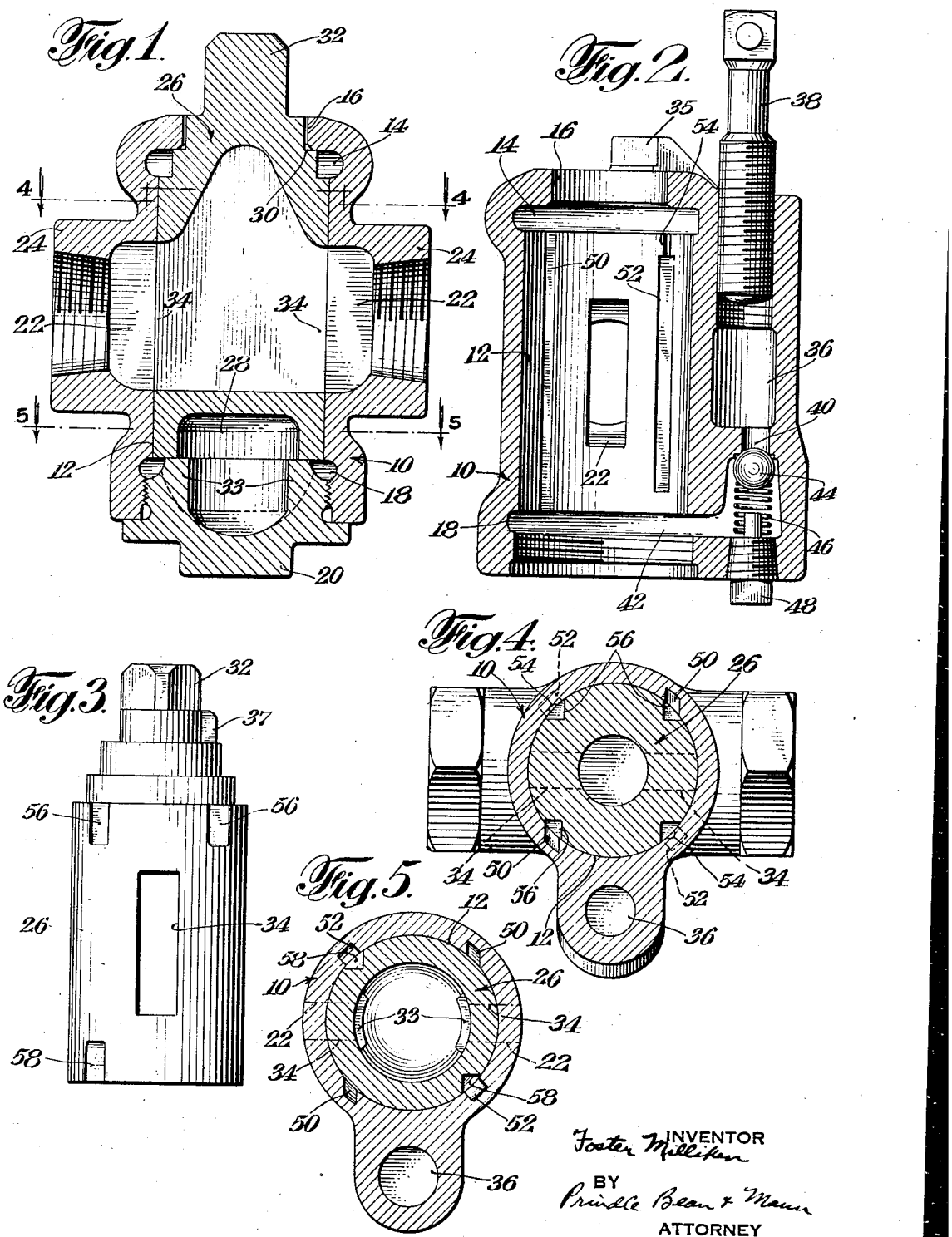

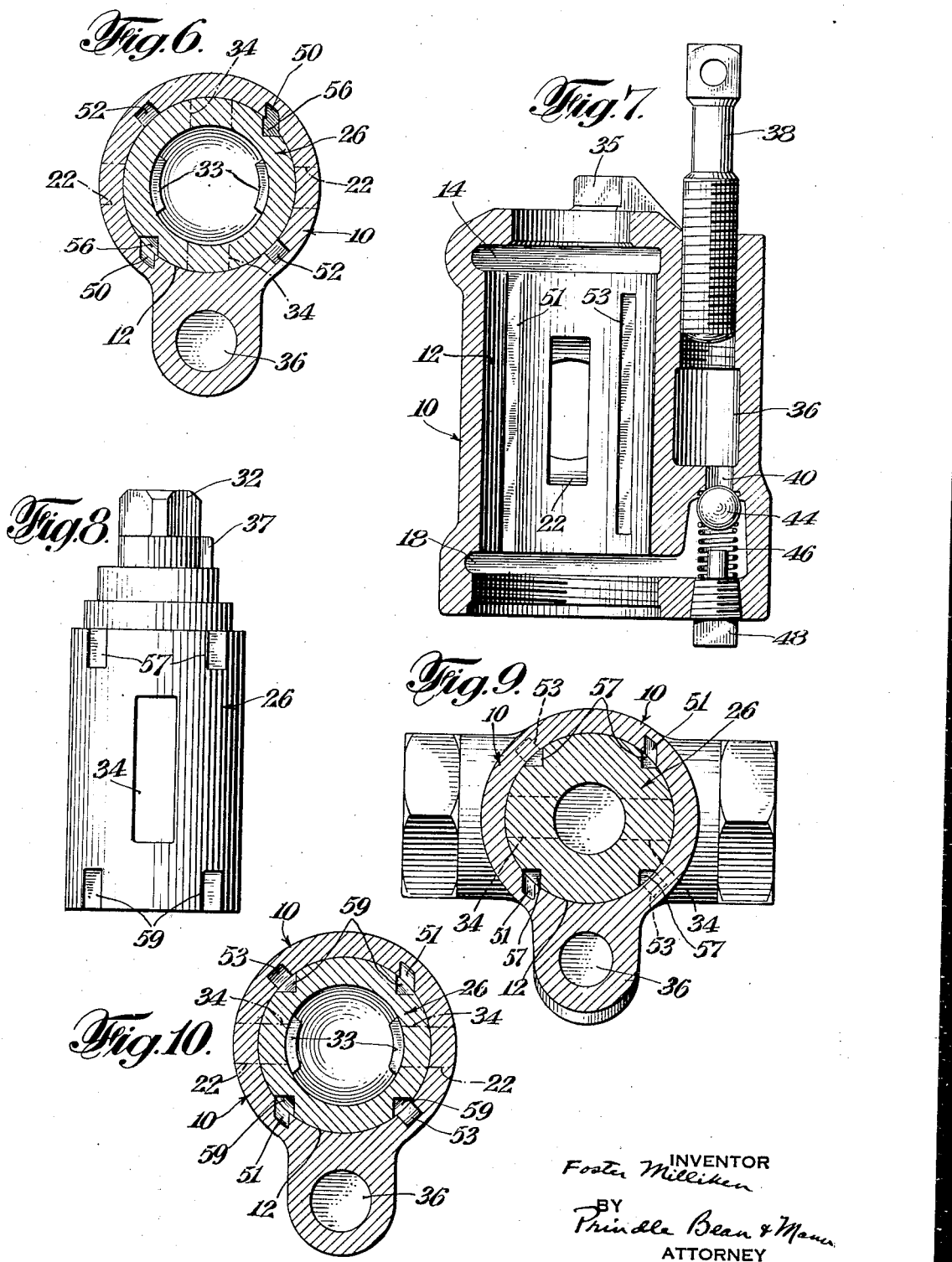

1,915,068

UNITED STATES PATENT OFFICE

FOSTER MILLIKEN, OF LAWRENCE, NEW YORK, ASSIGNOR TO MILLIKEN VALVE CORPORATION, A CORPORATION OF NEW YORK

VALVE ADAPTED TO BE LUBRICATED

Application filed October 24, 1930. Serial No. 490,830.

This invention relates to lubricated valves of the general type shown in my Reissue Patent No. 17,337 in which the plug is provided with a stem so that it may be turned, and the body or casing has a portion adapted to contact with the plug about the stem in a plane transverse the axis of the plug, and in which a lubricant groove is formed entirely about the plug immediately adjacent such line of contact; and particularly to valves of this type in which the plug and its seat are substantially cylindrical. In the embodiment of the valve here shown no separate gland is used and the body is formed with a bearing ring of smaller diameter than the plug and is formed with a bearing surface against which the shoulder of the plug may contact. The plug is inserted through an opening in the bottom of the valve which is closed by a cap provided with lugs which contact with the bottom of the plug. This construction is simple and particularly strong and does away with danger of having the gland drawn down unevenly which may cause leakage.

In plugs of the general type referred to, it is frequently desirable to supply more than two vertical grease ducts connecting the top grease groove with the bottom grease chamber. This is particularly important in connection with valves having a cylindrical plug, for in such case the plug cannot be forced onto or off its seat as in the case of a tapered plug, and there is always clearance between the plug and its seat which must be maintained full of lubricant under pressure to keep the valve from leaking. Where only two vertical grease ducts are supplied the transmission of pressure to the grease film between the plug and its seat may not be sufficiently uniform to accomplish the desired result.

If four grease ducts are used and these are simply cut through from the top to the bottom, there will be an adequate supply of grease to the plug, but if the grease pressure is substantially higher than the line pressure there is danger that when the plug is turned an undue amount of grease will be forced out at the time that two of the ducts cross the ports in the cooperating member. Thus if the ducts are formed in the body, when the plug is rotated the ports in the plug will cross two of the ducts in the plug; whereas, if the ducts are formed in the plug, when the plug is rotated two of the ducts will cross the ports in the body. At the same time it is highly desirable that free access be had to all of the ducts in some position of the valve, for it is advantageous to be able to store the valves free of lubricant and to be able to fill them with lubricant when desired without taking them apart.

I have found that I can overcome the difficulties presented by this problem by forming some of the vertical ducts as incomplete and supplying dwarf ducts in the cooperating member which will register and overlap the incomplete ducts when the valve is in either open or closed position. Inasmuch as only two of the vertical ducts will cross port openings, only these two need be made incomplete. If desired, four pair of dwarf ducts may be supplied so that the incomplete ducts are in registry with the dwarf ducts at both top and bottom when the valve is in either open or closed position. This is not, however, essential, for the desired results can be obtained if only two pair of the dwarf ducts are supplied which, as desired, may be positioned to register with the incomplete ducts in either open or closed position but not both, or four dwarf ducts may be supplied at one end and two dwarf ducts may be supplied at the other. Also I have found that it is useful under certain circumstances to make a small connection between the incomplete ducts and either the top or bottom grease groove, as this permits the grease in the incomplete duct to be maintained under pressure at all times, though it will not cause the grease to bulge out of its duct in crossing an open port. Except for ease of manufacture it is of small consequence whether the main ducts are formed in the body and the dwarf ducts in the plug, or whether these are reversed.

For the purposes of illustration I have in the accompanying drawings, shown my invention in two different embodiments thereof. In these drawings Fig. 1 represents a vertical section through the body and plug of a valve taken along the axis line of the ports; Fig. 2 is a sectional view at right angles to Fig. 1 with the plug removed; Fig. 3 is a side view of the plug; Fig. 4 is a horizontal sectional view on line 4—4 of Fig. 1; Figs. 5 and 6 are sectional views on line 5—5 of Fig. 1 showing the plug in open and closed position respectively, and Figs. 7, 8, 9 and 10 are views directly corresponding to Figs. 2, 3, 4 and 5 showing a modified form of construction.

The valve here selected for the purpose of illustration comprises a main body portion 10 having a cylindrical seating surface 12. Above the seating surface 12 is a groove 14, above which the body 10 is contracted to form the bearing ring 16. Below the seating surface 12 is an enlarged groove 18 and still further down the body is threaded to receive a bottom cap 20. Ports 22 (see Figs. 2 and 7) register with the pipe connections 24.

The plug 26 has a cylindrical seating surface of the same length as the seating surface 12 of the body 10 and at the bottom is cut off approximately in line with this seating surface. The bottom of the plug may be cored out as indicated at 28 to form an enlarged space for lubricant. At the top, the plug 26 is slightly reduced in diameter immediately above the seating surface so as to form a recess to cooperate with the groove 14. Above this is formed a circular bearing surface 30 adapted to cooperate with the bearing ring 16 of the body. A squared stem 32 extends up above the top of the body 10. The center of the plug is hollow and provided with ports 34 adapted to register with the ports 22 when the valve is open. The bottom cap 20 is provided with two upwardly extending bearing lugs 33, which serve to keep the plug properly positioned in the body, and is so shaped as to provide a large lubricant chamber covering a substantial portion of the lower end of the plug. The area of this chamber is substantially greater than the area of the upper part of the plug covered by the lubricant groove 14 so that the pressure of grease in these chambers tends to keep bearing surface 30 forced against bearing ring 16 of the body. It may also be noted that the body carries stops as 35 adapted to cooperate with lug 37 on the plug to limit the rotation of the plug.

At one side the body 10 is enlarged to form space for the lubricant receiving chamber 36. From this chamber a threaded opening extends upwardly adapted to receive a screw 38 by means of which the lubricant may be put under pressure. From the bottom of the lubricant receiving chamber 36 extends a passage 40 connecting through the passage 42 with the channel 18. In this channel I preferably provide a ball valve 44 which is normally kept closed by a spring 46 and to which access may be had by a plug 48. The parts thus far described are common to both forms of valve here described.

Referring now to Figs. 2 to 6 inclusive, the body is provided with two complete ducts 50 which extend from the top to the bottom of the seating surface and are arranged diametrically opposite to each other and on a diameter drawn at an angle of 45° to the axis through the ports 22. Likewise formed in the seating surface of the body are two incomplete grease ducts 52 which are positioned diametrically opposite to each other and on a diameter at an angle of 90° to that on which the grease ducts 50 are positioned. Grease ducts 52 stop slightly short of the top and bottom of the seating surface of the body but as here shown a supplemental small notch 54 connects the top of each incomplete grease duct 52 with the groove 14. The grease ducts 50 and 52 may be made of the same cross sectional size and shape but for the purposes of clarity and so that they may be readily distinguished in the sectional views I have shown them of different cross sectional shape.

As shown in Fig. 3 the plug of this embodiment of my invention is provided with four dwarf ducts 56 around its top which are positioned to register with the ducts 50 and 52 when the valve is either open or closed and are of sufficient length to overlap the incomplete ducts 52. Likewise as indicated in Fig. 3 as well as in Figs. 5 and 6 two dwarf ducts 58 are provided at the bottom of the plug in such a position as to register with the incomplete ducts 52, when the plug is in open position and to register with the complete ducts 50 when the valve is in closed position.

With this type of valve the plug can be put in place as indicated in Fig. 1 and the bottom cap 20 screwed in. Thereafter when the use to which the valve is to be put has been decided upon the screw 38 is removed and an appropriate type of lubricant inserted into the lubricant chamber 36. The screw 38 is then forced down while the valve is in open position. All of the ducts become filled with lubricant, as air can escape between the plug and body and also at the top air can escape between the bearing surfaces 30 and the bearing ring 16. However, when all of the ducts have been filled with lubricant the clearances are small enough so that the lubricant will not follow the path of the air and a substantial pressure can be built up on the lubricant. As the plug is rotated the incomplete ducts 52 will be largely cut off at the bottom from the lubricant supply but will always be connected with lubricant under pressure through the small notches 54. The port will be entirely framed by the lubricant grooves and ducts when the valve is in open position but will be incompletely framed by the lubricant passages when the valve is in closed position. However, when the plug is in either position there will be a free supply of lubricant to all of the vertical ducts so that a film of lubricant under pressure can be maintained between the seating surface of the plug and body. It will be noted that in Figs. 5 and 6 the position of the ports 34 and 22 is indicated by dot and dash lines so that it will be seen that Fig. 5 shows the plug in open position and that Fig. 6 shows it in closed position.

In the modification shown in Figs. 7, 8, 9 and 10 the body has complete ducts 51 exactly similar to the ducts 50 and incomplete ducts 53 similar to the ducts 52 but has no notch corresponding to the notch 54. The plug at the top is similar to the first form described having four dwarf ducts 57 corresponding to the ducts 56, but at the bottom differs in that there are four dwarf ducts 59 supplied instead of simply the two dwarf ducts 58. With this arrangement complete lines of grease in the ducts are provided on both sides of each port when the valve is in closed as well as in open position.

It is apparent that many other combinations of complete, incomplete and dwarf ducts can be made as desired, but in all the arrangements where the use of such ducts is combined with complete grease grooves above and below the seating surfaces, the pressures can readily be maintained equal, to maintain a uniform film of grease under pressure between the cylindrical plug and its seat.

What I claim is:

1. An integral valve body having a cylindrical seat, and having an opening at one end of a diameter smaller than the seat, about which is a bearing surface of smaller diameter than the seat symmetrical with respect to the axis of such seat and such that an extension thereof would be substantially transverse such axis, said body also having an opening at the other end of the seat of at least as great a diameter as the seat, a plug for such valve adapted to be inserted through such larger opening having a seating surface adapted to cooperate with said cylindrical seat, a stem adapted to extend through said smaller opening, a bearing surface adjacent such plug adapted to cooperate with the said bearing surface of the body so that when said plug is forced towards the end of the body with the smaller opening, such surface will form a close contact entirely around the axis of the plug and will limit movement of the plug in such direction, such plug also having a portion of smaller diameter than the body at a point immediately adjacent such bearing surfaces to provide a lubricant groove around the axis of the plug, means for closing the larger opening in the body shaped to form a lubricant chamber at the end of the plug covering a substantially greater area of the end of the plug than does said lubricant groove at the other end, lubricant ducts between the body and the plug connecting said lubricant groove and lubricant chamber and means for introducing grease under pressure into said grease chamber.

2. A structure as specified in claim 1, which comprises a pair of lubricant ducts connecting said lubricant chamber with said lubricant groove, a second pair of incomplete lubricant ducts extending vertically in the seating surface of either the plug or its seat positioned between said lubricant chamber and said lubricant groove but not connecting them, and dwarf ducts in the other of said main valve members adapted to overlap said incomplete ducts when the plug is in a proper position, so that the lubricant chamber will be connected with the lubricant groove through the dwarf ducts and incomplete ducts.

3. A structure as specified in claim 1 which comprises lubricant ducts connecting said lubricant chamber and said lubricant groove and incomplete lubricant ducts in the seating surface of the plug stopping short of the top and bottom thereof and a dwarf duct formed in the body and running from the lubricant chamber adapted to overlap said incomplete duct for a given position of the plug.

In testimony that I claim the foregoing, I have hereunto set my hand this 21st day of October, 1930.

FOSTER MILLIKEN.